(12) United States Patent
Lerche et al.

(10) Patent No.: US 10,539,686 B2
(45) Date of Patent: Jan. 21, 2020

(54) METHOD FOR THE SIGNAL PROCESSING OF A PHOTOSENSOR

(71) Applicant: FORSCHUNGSZENTRUM JUELICH GMBH, Juelich (DE)

(72) Inventors: Christoph Lerche, Herzogenrath (DE); Arne Berneking, Karlsruhe (DE); Nadim Joni Shah, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/344,409

(22) PCT Filed: Nov. 10, 2017

(86) PCT No.: PCT/DE2017/000380
§ 371 (c)(1),
(2) Date: Apr. 24, 2019

(87) PCT Pub. No.: WO2018/095447
PCT Pub. Date: May 31, 2018

(65) Prior Publication Data
US 2019/0339399 A1    Nov. 7, 2019

(30) Foreign Application Priority Data

Nov. 25, 2016 (DE) .................. 10 2016 014 113
Oct. 5, 2017 (DE) .................. 10 2017 009 365

(51) Int. Cl.
  *G01T 1/20* (2006.01)
  *G01T 1/24* (2006.01)
  *G01T 1/164* (2006.01)

(52) U.S. Cl.
  CPC .......... *G01T 1/2006* (2013.01); *G01T 1/1642* (2013.01); *G01T 1/248* (2013.01)

(58) Field of Classification Search
  CPC ...... G01T 1/2006; G01T 1/1642; G01T 1/248
  See application file for complete search history.

(56) References Cited

U.S. PATENT DOCUMENTS

| | | | | |
|---|---|---|---|---|
| 5,576,546 A | * | 11/1996 | Gagnon | ................ G01T 1/1642 250/363.07 |
| 5,813,983 A | * | 9/1998 | DiFilippo | ............ G01T 1/1642 250/363.02 |

(Continued)

FOREIGN PATENT DOCUMENTS

| | | |
|---|---|---|
| DE | 102013014360 A1 | 3/2015 |
| DE | 102016006056 A1 | 6/2017 |
| DE | 102016008904 A1 | 1/2018 |

OTHER PUBLICATIONS

A. Gola, et al., "A Novel Approach to Position-Sensitive Silicon Photomultipliers: First Results", *2013 IEEE Nuclear Science Symposium and Medical Imaging Conference (2013 NSS/MIC)*, Oct. 27-Nov. 2, 2018, pp. 1-4.

(Continued)

*Primary Examiner* — Marcus H Taningco
(74) *Attorney, Agent, or Firm* — Leydig, Voit & Mayer, Ltd.

(57) ABSTRACT

A method for photosensor signal processing includes carrying out, by measuring a combination of readout channels of a direction e with linearly increasing and linearly decreasing signal strength, a linear coding in at least one e-direction. The linearly increasing and linearly decreasing signal strengths of readout channels of the direction e, which are respectively used for the linear coding, are multiplied by each other. The linear coding satisfies the following edge condition: $Q_1(e) = c_1 \cdot e^{c_2} + c_3$, $Q_2(e) = c_4 \cdot e^{c_5} + c_6$, $c_1 = \text{const.} \in (0, \infty)$, $c_4 = \text{const.} \in (-\infty, 0)$, $c_3, c_6 = \text{const.} \in (-\infty, \infty)$, and $0.5 < c_2$; $c_5 < 1.5$. Q1 denotes the charge of the output channel signal strengths increasing via the e-position, and Q2 denotes the (Continued)

charge of the output channel signal strengths decreasing via the e-position and the coding direction.

5 Claims, 10 Drawing Sheets

(56) References Cited

U.S. PATENT DOCUMENTS

| | | | |
|---|---|---|---|
| 6,288,399 B1* | 9/2001 | Andreaco | G01T 1/1642 250/363.03 |
| 7,291,841 B2* | 11/2007 | Nelson | G01T 1/243 250/370.01 |
| 7,476,864 B2 | 1/2009 | Benlloch Baviera et al. | |
| 8,849,002 B2* | 9/2014 | Chinn | A61B 6/5205 370/464 |
| 2009/0050811 A1* | 2/2009 | Barrett | G01T 1/1642 250/363.04 |
| 2009/0134334 A1* | 5/2009 | Nelson | G01T 1/2002 250/361 R |
| 2018/0329085 A1 | 11/2018 | Lerche et al. | |

OTHER PUBLICATIONS

Volkmar Schulz, et al., Sensitivity encoded silicon photomultiplier—a new sensor for high-resolution PET-MRI, Phys. Med. Biol. 58 (2013), Jun. 20, 2013, pp. 4733-4748.
P. Fischer, et al., "Interpolating Silicon Photomultipliers", NIMPRA, Nov. 2012, pp. 1-13.
Arne Berneking, "Characterization of Sensitivity encoded Silicon Photomultiplier for high resolution simultaneous PET/MR Imaging", Diploma Thesis, RWTH Aachen University, Dec. 3, 2012, pp. 1-161.
Ronald Grazioso, et al., "APD Performance in Light Sharing PET Applications" IEEE Transactions on Nuclear Science, vol. 52, No. 5, Oct. 2005, pp. 1413-1416.
M. Watanabe, et al., "A High Resolution Animal PET Scanner Using Compact PS-PMT Detectors", IEEE Transactions on Nuclear Science, vol. 44, No. 3, Jun. 1997, pp. 1277-1282.
Samuel España, et al., "DigiPET: sub-millimeter spatial resolution small-animal PET imaging using thin monolithic scintillators", Phys. Med. Biol. 59 (2014), Jun. 3, 2014, pp. 3405-3420.
Ch. W. Lerche, et al., "Nuclear Instruments and Methods in Physics Research A, Nuclear Instruments and Methods in Physics Research A 600 (2009), Dec. 25, 2008.
Mikiko Ito, et al., "Positron Emission Tomography (PET) Detectors with Depth-of-Interactio (DOI) Capability", Biomed Eng Lett (2011) 1, May 16, 2011, pp. 70-81.
Martin S. Judenhofer, et al., "Simultaneous PET-MRI: a new approach for functional and morphological imaging, Nature Medicine, vol. 14, No. 4, Apr. 2008, pp. 459-465.
Sibylle I. Ziegler, et al., "A prototype high-resolution animal positron tomograph with avalanche photodiode arrays and LSO crystals, European Journal of Nuclear Medicine vol. 28, No. 2, Feb. 2001, pp. 136-143.
Marcin Balcerzyk, et al., "Preliminary performance evaluation of a high resolution small animal PET scanner with monolithic crystals and depth-of-interaction encoding", *2008 8th IEEE International Conference on BioInformatics and BioEngineering*, Oct. 8-10, 2008, pp. 1-4.
Marcin Balcerzyk, et al., "Initial performance evaluation of a high resolution Albira small animal ppositron emission tomography scanner with monolithic crystals and depth-of-interaction encoding from a user's perspective", Meas. Sci. Technol. 20 (2009), May 21, 2009, pp. 1-7.
David P. McElroy, et al., "First Results From MADPET-II: A Novel Detector and Readout System for High Resolution Small Animal PET", *2003 IEEE Nuclear Science Symposium, Conference Record (IEEE Cat. No. 03CH37515)*, Oct. 19-25, pp. 2043-2047.
A.J. González Martínez, et al., "Innovative PET detector concept based on SiPMs and continuous crystals", Nuclear Instruments and Methods in Physics Research A 695 (2012), Nov. 20, 2011, pp. 213-217.
Stefan Siegel, et al., "Simple Charge Division Readouts for Imaging Scintillator Arrays using a Multi-Channel PMT", IEEE Transactions on Nuclear Science, vol. 43, No. 3, Jun. 1996, pp. 1634-1641.
Tahereh Niknejad, et al., "Development of high-resolution detector module with depth of interaction identification for positron emission tomography", Nuclear Instruments and Methods in Physics Research A 845, Dec. 2017, pp. 684-688.
Tomoaki Tsuda, et al., "Performance Evaluation of a Subset of a Four-Layer LSO Detector for a Small Animal DOI PET Scanner: jPET-RD", IEEE Transactions on Nuclear Science, vol. 53, No. 1, Feb. 2006, pp. 35-39.
Antonio J. Gonzalez, et al., "The Mindview brain PET detector, feasibility study based on SiPM arrays", Nuclear Instruments and Methods in Physics Research A 818, Dec. 2016, pp. 82-90.

* cited by examiner

METHOD FOR THE SIGNAL PROCESSING OF A PHOTOSENSOR

CROSS REFERENCE TO RELATED APPLICATIONS

This application is a U.S. National Stage Application under 35 U.S.C. § 371 of International Application No. PCT/DE2017/000380 filed on Nov. 10, 2017, and claims benefit to German Patent Application Nos. DE 10 2016 014 113.1 filed on Nov. 25, 2016, and DE 10 2017 009 365.2 filed on Oct. 5, 2017. The International Application was published in German on May 31, 2018, as WO 2018/095447 A1 under PCT Article 21(2).

FIELD

The invention relates to methods for signal processing, and in particular to methods for processing signals of a photosensor.

BACKGROUND

According to the prior art, positron emission tomography detector rings are used in order to detect the ß+ß− annihilation radiation. The rings consist of scintillation crystals which are adjoined by photosensors which are capable of detecting the scintillation radiation. Typical photosensors are photomultipliers (PMT), avalanche photodiodes (ADP), photodiodes, and silicon photomultipliers (SiPM). The design is such that the detector ring is generally circular, wherein the object to be measured, e.g., a body part of a patient or animal, is placed in the center of the detector ring (PET ring). The use of radiodiagnostic agents generates ß+ß− annihilation radiation which is to be detected. The ß+ß− annihilation radiation impinges on scintillation crystals which are arranged annularly or squarely around the object to be examined and generate the scintillation radiation. The scintillation radiation is in turn registered by the photosensors which, in relation to the radiation source, are located in the concentric arrangement behind the scintillation crystal. However, the photosensors can also be arranged on other sides of the scintillation crystal—for example, in front of the scintillation crystal or laterally thereto. The scintillation crystal is a three-dimensional body. Based upon an arrangement in which the object to be examined emits annihilation radiation from the center of the detector ring, the cross-section on which the annihilation radiation impinges on the scintillation crystal spans an x-y axis. The depth of the scintillation crystal is referred to in this nomenclature as the z-axis. In an idealized representation, an object to be examined or an emission source for radiating an energy of 511 keV is located in the center of the detector ring, which energy ideally impinges perpendicularly on the x-y plane of the scintillation crystal and has a penetration depth along the z-axis of the scintillation crystal. The 511 keV annihilation radiation then triggers a scintillation at a point of the scintillation crystal along the z-axis, which scintillation is registered as a signal by the photosensor—for example, an SiPM. An SiPM is capable of detecting even individual photons.

There is a correlation between the sensitivity of the scintillation crystal and its length along the z-axis. The deeper the scintillation crystal is dimensioned, the more sensitive it is, since a scintillation event is the more likely to occur. In the detection of the annihilation radiation, rays are emitted in two opposite directions from the point at which the annihilation radiation is emitted, so that the rays form an angle of 180°. The line formed by these rays is referred to as the "line of response" (LOR). Accordingly, in the case of an annular detector, two rays impinge along the LOR on scintillation crystals, which, based upon the annular arrangement in whose center the emission source is located, are on opposite sides.

For photodetectors with light detection on only one side of the scintillation crystal, various established methods exist for determining the x- and y-position of an event. However, these do not include the z-position, and the exact position in the scintillation crystal where the gamma photon was stopped on the z-axis and converted to light is thus not determined. If the z-position is not determined as well, parallax errors, which are attributable to the so-called depth-of-interaction problem (DOI problem), occur in the determination of the LOR. The DOI problem occurs whenever the point from which the emission of the annihilation radiation emanates, in an annular detector, is not exactly in the center. The farther the emission center for an LOR is outside the center of a PET ring, the greater the problem becomes. In the design of a PET ring, this leads to a compromise between increasing the sensitivity through longer scintillation crystals and reducing the DOI errors through shorter scintillation crystals. In some areas of the PET application, there is the need to use PET rings (detector rings) closely adjacent to the examination object. This is particularly the case in medicine when patients are to be examined simultaneously with an MRI method and a PET method. In these hybrid scanners, the PET ring must fit into the opening of the MRI scanner tube. The PET ring used must consequently be dimensioned to be small in diameter so that it fits into the opening of the MRI ring. However, with a small dimensioning of the PET ring, there is the problem that the object to be examined, e.g., a body part of a small animal or even a human, can be arranged to be centered, but is dimensioned, when measured at the diameter of the PET ring, such that it reaches far into the edge regions of the opening of the PET ring. However, points from which annihilation radiation emanates are thus also positioned so close to the PET ring that the DOI problem becomes significant.

In past years, the resolution in small animal PET scanners, in particular, was significantly improved by the use of pixelated scintillation crystal blocks with ever smaller pixel sizes. In this case, the pixilation is realized on the x-y plane, so that tubes of pixels which are oriented in the z-direction are formed in the scintillation crystal. This was prompted especially by the need for ever higher spatial resolution in small animal PET scanners, since the examined object is very small. In the meantime, the pixel size has already reached the sub-millimeter range. This has amplified two problems which need to be solved. First, the pixelated crystal blocks consist of adhesive and reflector film which are located between the individual scintillation crystals in order to thus construct the pixelated block. The layer of adhesive and reflector film has an approximate thickness of 70 μm. Accordingly, pixelated arrays with particularly low pixel spacing have an increased sensitivity loss. In the case of an array with crystal pixels of 0.8 cm×0.8 cm size, as were used, for example, in [1], the ratio of adhesive and film to scintillation crystal is significantly reduced, so that the adhesive and film already make up a proportion of 29%. The scintillation crystal proportion is consequently reduced to 71%. In the other 29% of the volume, gamma quanta cannot be stopped and converted to light. If even smaller pixelated arrays of, for example, 0.5 cm×0.5 cm are used, the crystal proportion is even reduced to 59%. Therefore, the increase in resolution with pixelated arrays is always associated with a loss of sensitivity. The second problem with pixelated scintillation crystal arrays is that the emitted light is concentrated on a smaller area of the photosensor surface. This is a problem particularly for binary photosensors, such as SiPM's. An SiPM consists of several microcells which function as binary elements. They detect whether light has been detected or not. When light is detected, the microcell performs a breakthrough. The number of broken through microcells quantitatively indicates how much light has reached the detector surface. When two or more light quanta trigger a microcell, the output signal remains the same. The more light that hits an SiPM, the higher the probability of two or more light quanta impinging on the same microcell of the SiPM. These additional light quanta cannot be detected. Consequently, the probability of saturating a microcell is significantly higher when pixelated scintillation crystal arrays are used, since these arrays concentrate light more strongly on a small area of the photosensor. Saturation effects also lead to poorer energy resolution of the detectors.

Prior art detectors use SiPM-based photosensor technologies in order to enable magnetic resonance tomography (MRI) compatibility for use in MR/PET hybrid scanners. Another problem with hybrid scanners is that the space for PET detectors and associated electronics is limited by the tube diameter of the magnetic resonance imaging scanner (MRI). This applies, in particular, to ultra-high-field scanners. As a consequence of the narrower tube diameters, the PET scintillation crystals must be as short as possible. Shorter scintillation crystals also reduce the sensitivity. This also means that the PET ring is located closer to the examination object due to the requirements of the tube diameter. The parallax error is larger the closer to the PET ring the annihilations, and thus the resulting LOR, take place. This is because the gamma quanta no longer pass perpendicularly into the scintillation crystals when the annihilation occurs close to the PET ring. In the PET ring design, this has the consequence that the parallax errors increase and become stronger when the PET ring is close to the object to be examined, since annihilation can likewise occur close to the PET ring in this case. Apart from limitations by hybrid devices, it is also attempted to design the PET rings as small as possible due to higher sensitivity and lower cost.

Furthermore, it is known that photosensor concepts can include coding of the output channels, since the power consumption of the PET ring is increased by increasing the output channels. This is, however, limited by the design. A simple calculation illustrates this. A PET ring with a diameter of 8 cm and a length of 10 cm results in a detector surface area of 251 cm². If a 1-to-1 coupling of scintillation crystals and photosensors with a crystal pixel size of 0.8 mm is used, 39,270 readout channels are already needed if each channel is read out individually.

In order to achieve higher spatial resolutions, current sensor designs consist of sensor chips with narrower pixel sizes. This leads to a significant increase in the readout channels, which are limited by the power consumption, space, and data rates. As a consequence, position-sensitive (PS) coding methods were developed to reduce the number of readout channels of a photosensor [1-6].

A concept published in [7] proves the possibility of constructing a PET detector consisting of monolithic crystals and SiPM's. As already mentioned above, monolithic crystals solve the problem of sensitivity losses due to the space requirement of reflector films and associated adhesives. As a result, the production costs of monolithic crystals are lower. The thickness of the crystals used is 2 mm. The design used in [7] thereby reduces parallax errors, which is, however, paid for by the small extension of the scintillation crystal in the z-direction. At the same time, the detection efficiency is, however, low due to the low crystal height.

There are various possibilities for measuring DOI information and thus correcting parallax errors, which additionally detect light on a further crystal side. The costs are thereby immensely increased—particularly for prior art SiPM's. A concept for DOI detection which detects light only on one crystal side and uses monolithic crystals is published in [8] and patented in [9]. It uses the known principle that the light distribution of the crystal is dependent upon the DOI. The detector concept used is coupled with monolithic crystals to position-sensitive photomultiplier (PMT) H8500 from Hamamatsu. A resistor network is also used, which enables position coding and thus also output channel reduction. In this case, the standard deviation of the light distribution is used to estimate the DOI. In order to calculate the standard deviation, the moment of the $1^{st}$ and $2^{nd}$ orders of the light distribution is required. The moment of the $1^{st}$ order is already given by the linear coding of the output channels. In order to determine the moment of the $2^{nd}$ order, a sum network has been developed and integrated into the resistor network. This significantly increases the complexity of the sensor chip.

An overview of PET detectors with DOL detection is summarized in [10]. Descriptions and results of small animal PET and MR/PET hybrid scanners, which have been developed in recent years, are contained in [11-14].

The detector described in [7] is realized with monolithic crystals. A closely adjoining ring was designed, to increase sensitivity. Monolithic crystals were used at the same time. Due to the resulting short distance between the scintillation crystals and the examination object, the DOI problem is increased. The developers of the ring are therefore limited to a 2 mm crystal thickness. As a result, the sensitivity gained by the narrow ring and the use of monolithic crystals is lost again by the small thickness of the scintillation crystals. However, this work proves that high resolution is possible with monolithic crystals.

DOI positions can be determined by attaching sensors to two crystal faces. This requires double the photosensor surface. Currently, sensors are one of the most expensive components of a PET ring.

A three-dimensional animal PET scanner was integrated into a 7T animal scanner by Judenhofer et al. [11]. It is based upon APD's which use scintillation crystals having a thickness of 4.5 mm and consist of crystal arrays having 144 crystals and a distance of 1.6 mm. The crystal array is coupled to a 3-by-3 APD array. The axial field of view (FOV) is 19 mm. This developed system shows that space is greatly limited especially for integrated systems, which forces a compromise between crystal thickness and axial FOV. This results in the low sensitivity of 0.23% of the system. In addition, the DOI problem also limits the crystal thickness in this case.

A further prototype scanner, which was published under the name, MADPET, has been developed in its first version in Munich [12]. It is realized with APD's directly coupled to 3.7 mm×3.7 mm×12 mm crystals. This prototype scanner has the problem of increasing the readout channels when using 1-to-1 coupling. In the first scanner, it is not possible to read all channels simultaneously. Moreover, low sensitivity is a problem of the scanner. In a second version of the scanner, MADPET II, this problem was solved, and all APD's can be read out [15]. The second version also has a two-layer readout system, with two layers of crystals with interjacent APD's. Since the crystals are thus divided, DOI positions can also be determined. However, twice the amount of photosensor surface area is also required, and the readout channels are thus increased again. Moreover, as a result of approximately double the amount of photosensors, higher costs are incurred.

The possibility of DOI detection with position-sensitive PMT's has been proven in [10, 17].

Research results with detectors consisting of SiPM's and monolithic crystals are published in [16]. In this approach, SiPM's are used in the same way as the original concept for PMT's and APD's published in [8, 9]. In this method, the photosensors are optically coupled to only one side of the monocrystal. However, the linearly-coded sensor must be extended by a resistor network.

The German patent applications, 102016006056.5 and 102016008904.0, of the applicant disclose sensor chips with which the DOI problem can be solved or reduced.

SUMMARY

In an embodiment, the present invention provides a method for photosensor signal processing. The method includes carrying out, by measuring a combination of readout channels of a direction e with linearly increasing and linearly decreasing signal strength, a linear coding in at least one e-direction. The linearly increasing and linearly decreasing signal strengths of readout channels of the direction e, which are respectively used for the linear coding, are multiplied by each other. The linear coding satisfies the following edge condition: $Q_1(e) = c_1 \cdot e^{c_2} + c_3$, $Q_2(e) = c_4 \cdot e^{c_5} + c_6$, $c_1$=const. $\in (0, \infty)$, $c_4$=const. $\in (-\infty, 0)$, $c_3$, $c_6$=const. $\in (-\infty, \infty)$, and $0.5 < c_2$; $c_5 < 1.5$. Q1 denotes the charge of the output channel signal strengths increasing via the e-position, and Q2 denotes the charge of the output channel signal strengths decreasing via the e-position and the coding direction. The depth of interaction is approximated using $$\sigma^2_{light} = \frac{\mu_2}{\mu_0} - \frac{\mu_1^2}{\mu_0^2}$$

and associated calibration measurements from a first moment of the e-direction and a linear transformation of a second moment of the e-direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide methods for reading out signals of a photosensor which overcome certain disadvantages of prior art and with which the parallax error in the determination of an LOR can be reduced. According to embodiments of the invention, methods are provided that allow the use of scintillation monocrystals for the detection of signals in positron emission tomography, wherein the DOI problem can be avoided by reducing the parallax error in the determination of the LOR. Methods according to embodiments of the invention are suitable for all types of photosensors with monolithic crystals and pixelated crystal arrays which produce a depth of interaction-dependent light distribution and, additionally, respectively contain a spatial coding which should be as linear as possible. The PET detector does not have to be modified in this case. It is therefore also possible to upgrade existing PET and MR/PET systems on the software side with such methods.

The sensitivity and resolution of photosensors can be improved with methods according to embodiments of the invention, since the depth of interaction is additionally determined. The depth-of-interaction resolution depends upon the x-y resolution of the photosensor. Furthermore, methods according to embodiments of the invention, which are also compatible with MR, are suitable for operating photosensors together with an MRI—in particular, with high magnetic fields. The accuracy of small PET rings, or with PET rings that closely adjoin the examination object, can be improved. The space required by the additional electronics for determining the depth of interaction normally associated with the measuring arrangement can be reduced. Space that can usually consume sensitive photosensor surface area can be saved by the unnecessary integration of, for example, resistor networks. The costs for the device can be reduced. Methods according to embodiments of the invention are not to be limited in application to use in PET, but shall generally be capable of being used for scintillation monocrystals and arrays of scintillation crystals which have a light distribution dependent upon a depth of interaction.

With methods according to the invention, it is now possible to reduce parallax errors in the determination of the LOR's—in particular, in the case of scintillation monocrystals. The sensitivity and resolution of measuring methods and of measuring devices are improved. The use of scintillation monocrystals which are longer in the z-direction is made possible. Methods according to the invention can also be applied to photosensors which are operated together with an MRI device. Especially for devices with smaller tube dimensions, or if the PET ring closely adjoins the examination object, the parallax error is reduced. Space for the associated electronics and costs are saved. Methods according to the invention achieve a level of detail of the z-resolution dependent upon the x-y resolution. This can lead to a very high resolution of the depth of interaction—in particular, in the case of high-resolution photosensors, such as LG-SiPM, SeSP, or iSiPM. This results in a more accurate estimate of the $2^{nd}$ order moment. Methods according to the invention can be used for all photosensors which are coded spatially, in particular where the coding is as linear as possible, e.g., SiPM, such as LG-SiPM, SeSP and iSIPM, ADP, such as position-sensitive APD, or PMT, such as position-sensitive PMT, and arrays of scintillation crystals having a light distribution dependent upon the depth of interaction.

In the following, the invention is described in its general form, without this being interpreted restrictively.

A detector concept for PET measurements is provided in which each individual detector has at least one scintillation monocrystal and at least one photosensor which is positioned on one side of the scintillation crystal. The photosensor is preferably mounted on the x-y plane of the scintillation monocrystal—particularly preferably on the side of the scintillation monocrystal facing away from the center of the detector ring. In another embodiment, the photosensor may be mounted on a side of the scintillation monocrystal that is not on the x-y plane—for example, on the x-z or y-z plane. This, however, has the disadvantage that, for photo sensors that are mounted on the x-z or y-z plane, scanner sensitivity losses arise. If the sensor is located on the side facing the center, additional Compton effects arise.

Multiple scintillation monocrystals can also be coupled to one or more photosensors.

The use of the scintillation monocrystal has the advantage that the sensitivity of the monocrystal to pixelated scintillation crystals can be maximized. In the case of pixelated scintillation crystals, the efficiency of the scintillation monocrystals is significantly reduced, e.g., to only 71% or 59% with a crystal pixel size of 0.8 mm×0.8 mm or 0.5 mm×0.5 mm of a pixelated crystal array. The scintillation monocrystal may, for example, consist—but not restrictively—of LSO, LYSO, BGO, GSO, $BaF_2$, or NaI:Tl (thallium-doped sodium iodide). The materials are known to the person skilled in the art. The ratio of the z-dimension of the scintillation monocrystal to its dimension in the x-direction of less than or equal to 1 leads to good results in the case of a square cross-section for x-y. The best results are obtained with a ratio of 0.25. Optionally, the ratio can also be smaller. The length of the scintillation monocrystal thereby achieved is more likely determined by practical circumstances, such as the diameter of the PET ring or the costs associated with large monocrystals. The dimensioning of the scintillation monocrystal in the z-direction depends upon the desired sensitivity to be achieved. Achieving the large dimension of the scintillation monocrystal in the z-direction is a result of the readout of the photosensor according to the invention described below, which enables such dimensioning in which minimization of DOI errors occurs.

The method can also be used when using specially produced scintillation crystal arrays. The requirement in this case is that the crystal arrays be constructed in such a way that a light distribution over the sensor surface is produced as a function of the depth of interaction. A recently published method is to mount a light guide for light distribution on the surface facing away from the sensor. Scintillation light is reflected there and distributed to several pixels as a function of the depth of interaction in the pixel [18]. Another known method in this respect is superposing 2 or more crystal arrays, which are offset from one another, so that a top crystal distributes light to several—typically, 4—underlying crystals. Based upon the width, it can thus be decided in which crystal array layer the scintillation event took place [19], [20].

Any photosensor which includes a spatial coding can be used with the method according to the invention.

One photosensor or several small photosensors that are assembled to form a larger photosensor can be mounted on a scintillation monocrystal. These photosensors can be glued onto the scintillation monocrystal. If several small photosensors are assembled, they are considered a single photosensor within the meaning of the invention if they are mounted together on one side of the scintillation monocrystal. The adhesive used for this purpose should be transparent. Furthermore, a layer of a light distributor may be located between the scintillation monocrystal and the photosensor if the light intensity is too bundled. An arrangement is also possible in which more than one photosensor is mounted on the monocrystal. For example, a stack along the z-axis can be provided, in which photosensors and scintillation monocrystals alternate. This is particularly expedient when scintillation monocrystals are used in which the light distribution in certain crystal regions cannot be differentiated to such an extent, and a division of the scintillation monocrystal into several layers with a respective sensor is expedient. In another embodiment, photosensors may also be mounted on the sides of the scintillation monocrystal that are not on the x-y plane of the scintillation monocrystal. One, two, or more, e.g., 3, photosensors can be mounted on different sides. In this case, photosensors can be mounted on two opposite sides of the scintillation monocrystal or on adjoining sides of the scintillation monocrystal which are in the x-z or y-z direction. Any sub-combination is conceivable. The variant in which photosensors are mounted on opposite sides has the advantage that the accuracy is thus increased when a measurement signal is received. However, the advantage of the embodiment according to the invention of the method and of the device is precisely that the signals have to be read out only on one side of the scintillation monocrystal. This corresponds to an embodiment with a single photosensor. In this way, the method and device according to the invention also become cost-effective.

The photosensor is designed according to the invention in such a way that, in the x-direction and/or in the y-direction, it allows a linear coding of the currents with respect to the position of the corresponding pixel. For this purpose, the sensor chip can be designed in different ways, inter alia, with the coding possibilities mentioned in the prior art, which, for example, can be realized with a resistor network.

A linear coding of the signals or the currents in the x-direction and the y-direction then respectively results in linearly increasing and linearly decreasing signal strengths for the output channels, which signal strengths are respectively multiplied by each other, according to the invention, for the x-direction and/or for the y-direction.

According to the invention, any combination of readout channels with linearly increasing and decreasing signal strengths for which the linearly increasing and linearly decreasing signals are multiplied by each other can be used for the linear coding. The direction in which the signal strengths increase or decrease linearly can deviate from the x- and y-direction of the photosensor. In this case, a direction of the linearly increasing and decreasing signal strengths is denoted by e.

In a generally preferred case, the readout channels are exclusively situated on the x-axis or the y-axis of the photosensor.

Figure 1:
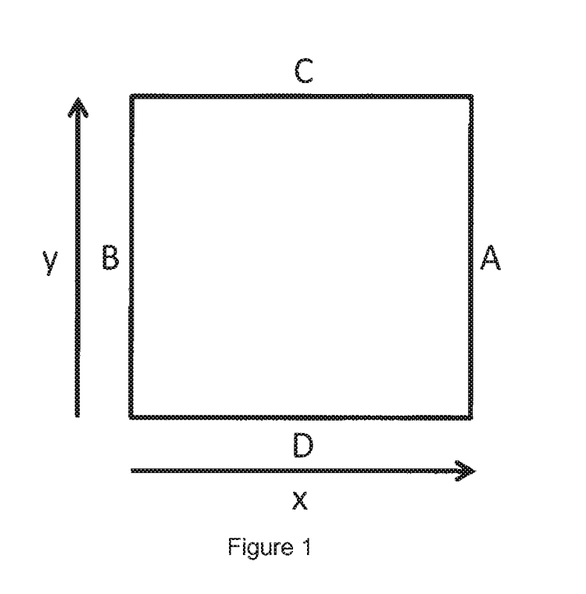
FIG. 1 shows a photosensor having output channels A, B, C, and D in schematic form.

In one embodiment, as can be seen from FIG. 1, output channels A and B are available for the x-direction, and output channels C and D are available for the y-direction, which provide a linearly-coded signal of the light distribution.

The x-position is calculated from the currents Q of the channels A and B according to formula 1:

$$x = \frac{Q_A - Q_B}{Q_A + Q_B} \qquad \text{(Formula 1)}$$

The y-position is calculated from the currents Q of the channels C and D according to formula 2:

$$y = \frac{Q_C - Q_D}{Q_C + Q_D} \qquad \text{(Formula 2)}$$

In this case, the x-y position is calculated from the detected currents Q of the channels A through D. Thus, the x- and y-positions result from the formulae:

$$x = \frac{Q_A - Q_B}{Q_A + Q_B} \qquad \text{(Formula 1)}$$

and $$y = \frac{Q_C - Q_D}{Q_C + Q_D} \qquad \text{(Formula 2)}$$

In this embodiment, the signals of channels A and B for the x-direction and C and D for the y-direction are multiplied by each other.

In an embodiment of the invention in which four readout channels contribute to the linear coding, viz., any combination of readout channels to the linearly increasing and decreasing signal strengths or, in a special case, linearly increasing and decreasing signal strengths in the x- and/or y-direction, the signal strengths for the x- and/or y-position can be described by the formulae 3 and 4.

$$X=((Q_F+Q_H)-(Q_E+Q_G))/(Q_E+Q_F+Q_G+Q_H) \qquad \text{(Formula 3)}$$

$$y=((Q_E+Q_F)-(Q_G+Q_H))/(Q_E+Q_F+Q_G+Q_H) \qquad \text{(Formula 4)}$$

Figure 2:
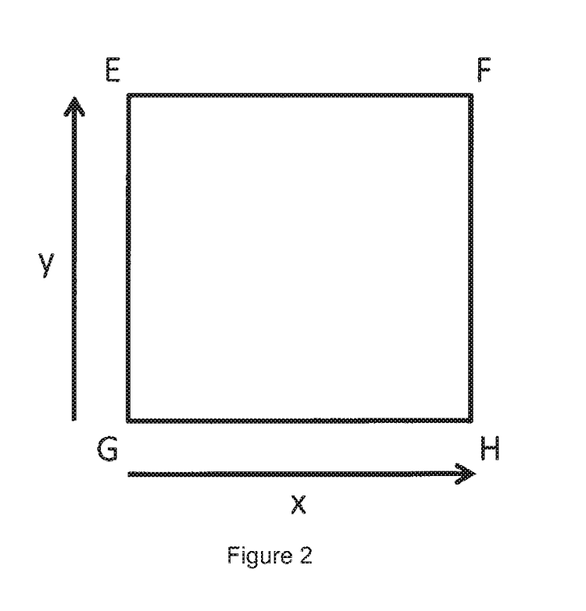
FIG. 2 shows a photosensor having output channels E, F, G, and H in schematic form.

In this embodiment, resistor networks or resistive layers may be used. In doing so, the currents that result in the signals can, for example, be distributed to the corners of the photosensor. For clarification purposes, a photosensor with the corners E, F, G, and H is shown in FIG. 2.

The total energy of a scintillation event is calculated as follows:

$$E=\text{const.}\cdot(Q_A+Q_B+Q_C+Q_D) \qquad \text{(Formula 5)}$$

or $$E=\text{const.}*(Q_E+Q_F+Q_G+Q_H) \qquad \text{(Formula 6)}$$

Formula 5 or 6 calculates the energy or the moment of $0^{th}$ order to and the position along x and/or y the moment of $1^{st}$ order $\mu_1$ of the sampled light distribution.

The standard deviation of the light distribution $\sigma_{light}$, which contains the DOI information, is calculated using the $2^{nd}$ moment $\mu_2$ according to the following formula:

$$\sigma_{light}^2 = \frac{\mu_2}{\mu_0} - \frac{\mu_1^2}{\mu_0^2} \qquad \text{(Formula 7)}$$

The $2^{nd}$ order moment is determined according to the prior art by a summing network which generates a signal which is quadratically coded in the position x or y.

According to the invention, the output signals obtained by output channels A and B and/or C and D are multiplied by each other if the spatial coding takes place according to formulae 1 and/or 2.

If the spatial coding takes place according to formulae 3 and 4, a value very similar to the moment of the $2^{nd}$ order is obtained by the following multiplication:

$$(Q_F+Q_H)*(Q_E+Q_G) \text{ for the x-direction} \qquad \text{(Formula 8)}$$

and/or $$(Q_E+Q_F)*(Q_G+Q_H) \text{ for the y-direction} \qquad \text{(Formula 9)}$$

Figure 3:
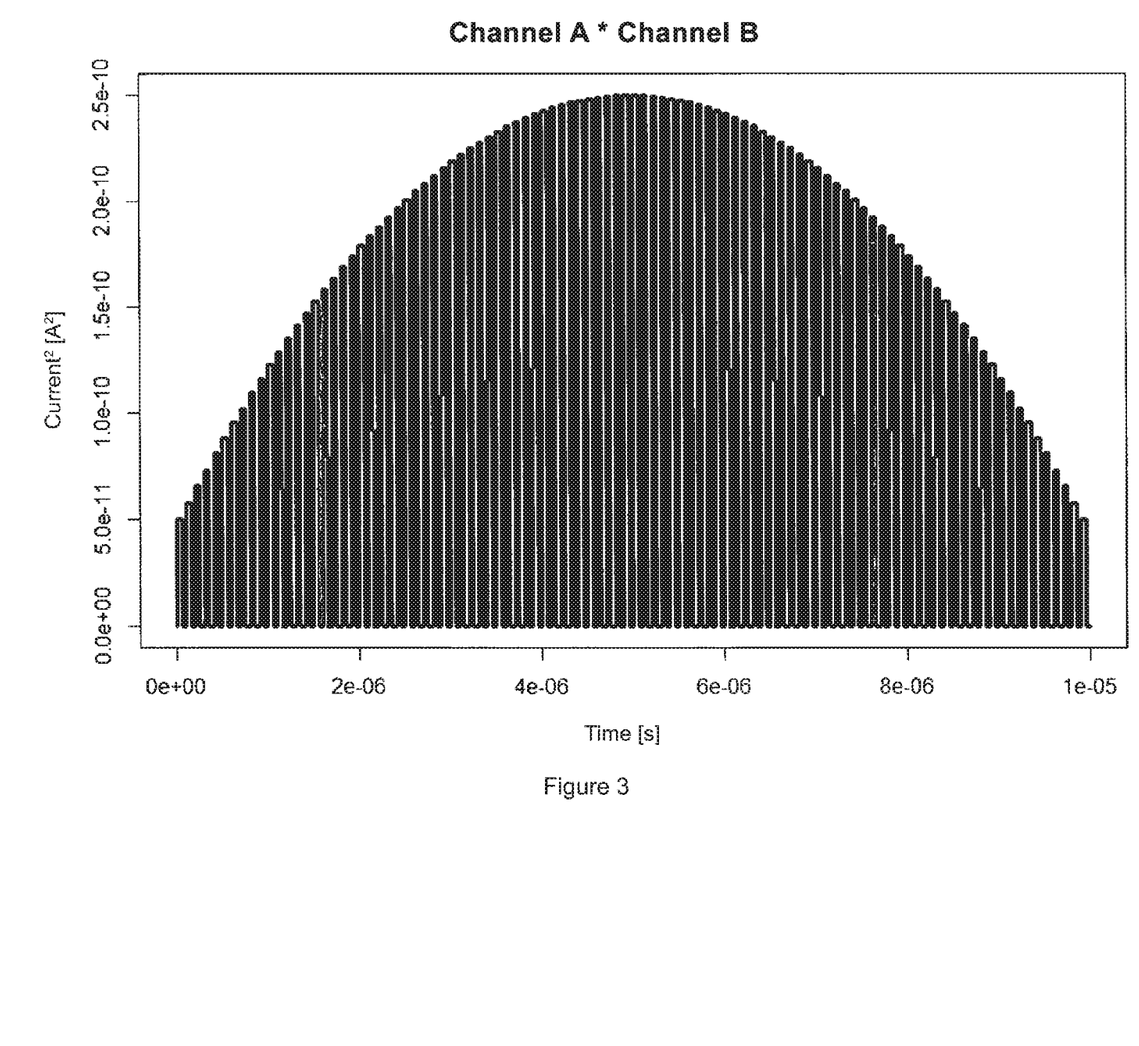
FIG. 3 shows a multiplied photocurrent profile of channels A and B plotted against time in seconds.
Figure 4:
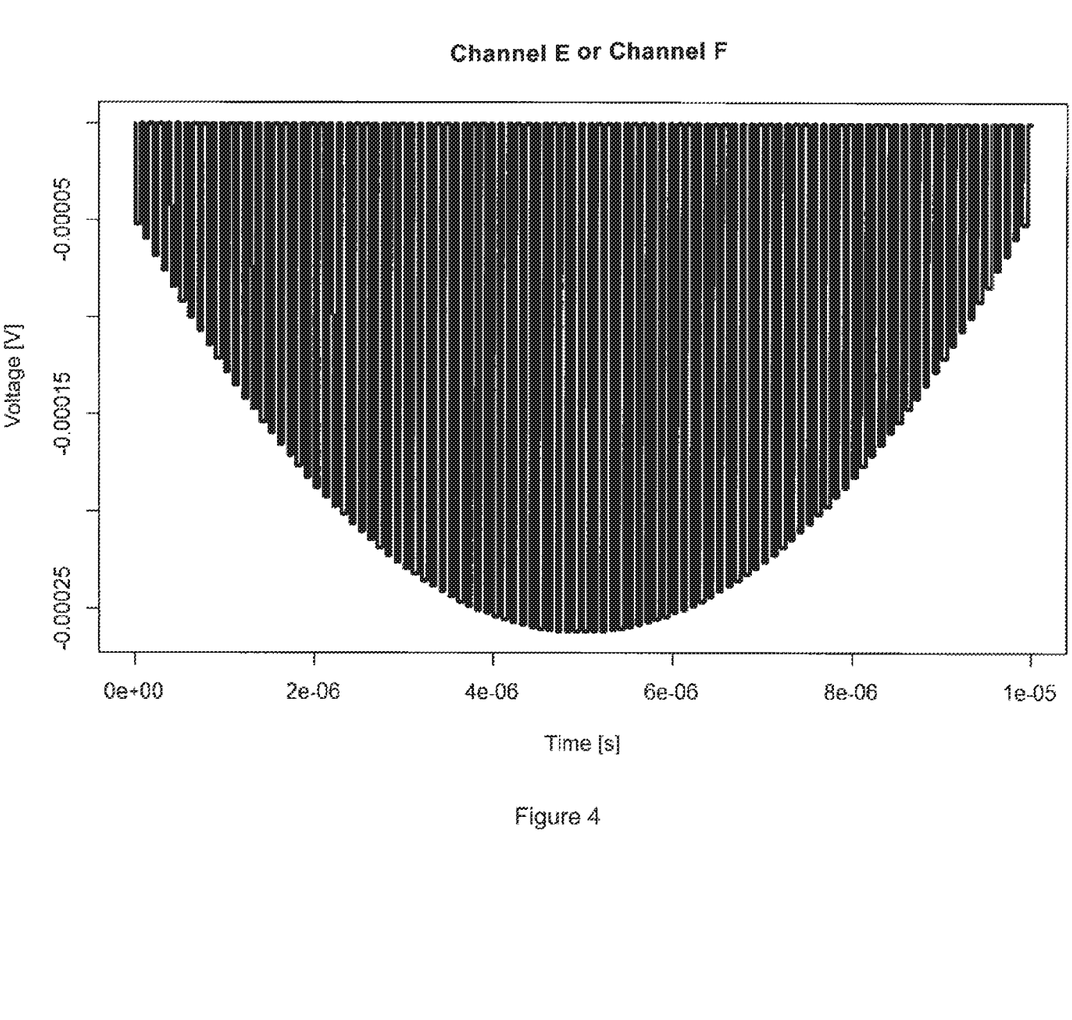
FIG. 4 shows a voltage profile of channels E and F plotted against time in seconds.

Because the signals $Q_A$, $Q_B$, $Q_C$, $Q_D$, $Q_F$, $Q_G$, $Q_E$, $Q_G$, and $Q_1$, $Q_2$ from the formulae 1, 2, 3, 4, 5, 6, 8, 9 and the below-described formula 11 are linearly coded with the position of the current-supplying pixel, the products $(Q_F+Q_H)*(Q_E+Q_G)$, $(Q_E+Q_F)*(Q_G+Q_H)$, $Q_A*Q_B$, $Q_C*Q_D$, and $Q_1*Q_2$ must be coded quadratically with the position of the current-supplying pixel. In the case of currents in only a single pixel, i.e., all currents in the other pixels disappear, a precise square coding results, which is shown in FIG. 3 and which is identical, as shown in FIG. 4, to the signal from a summing circuit, up to a global, linear transformation. In this case, the linear transformation can result in signals in other units, without impairing the functionality of the method. In the case of currents of several pixels, such as are produced by typical scintillator light distributions, additional mixed terms result, which, however, do not interfere with the functionality of the method. This can be demonstrated most easily by simulations, as can be seen in the figures.

Figure 8:
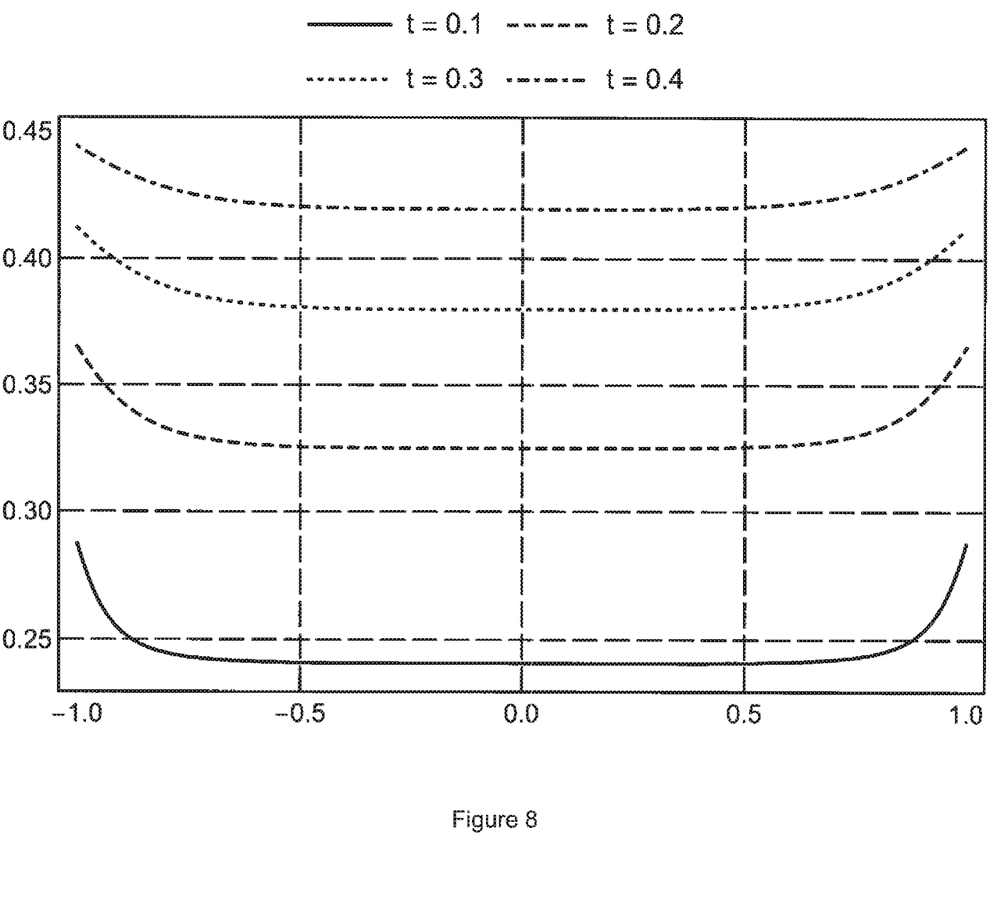
FIG. 8 shows a standard deviation, which can be determined according to the prior art from normalized $1^{st}$ and $2^{nd}$ moments with the aid of formula 7.
Figure 11:
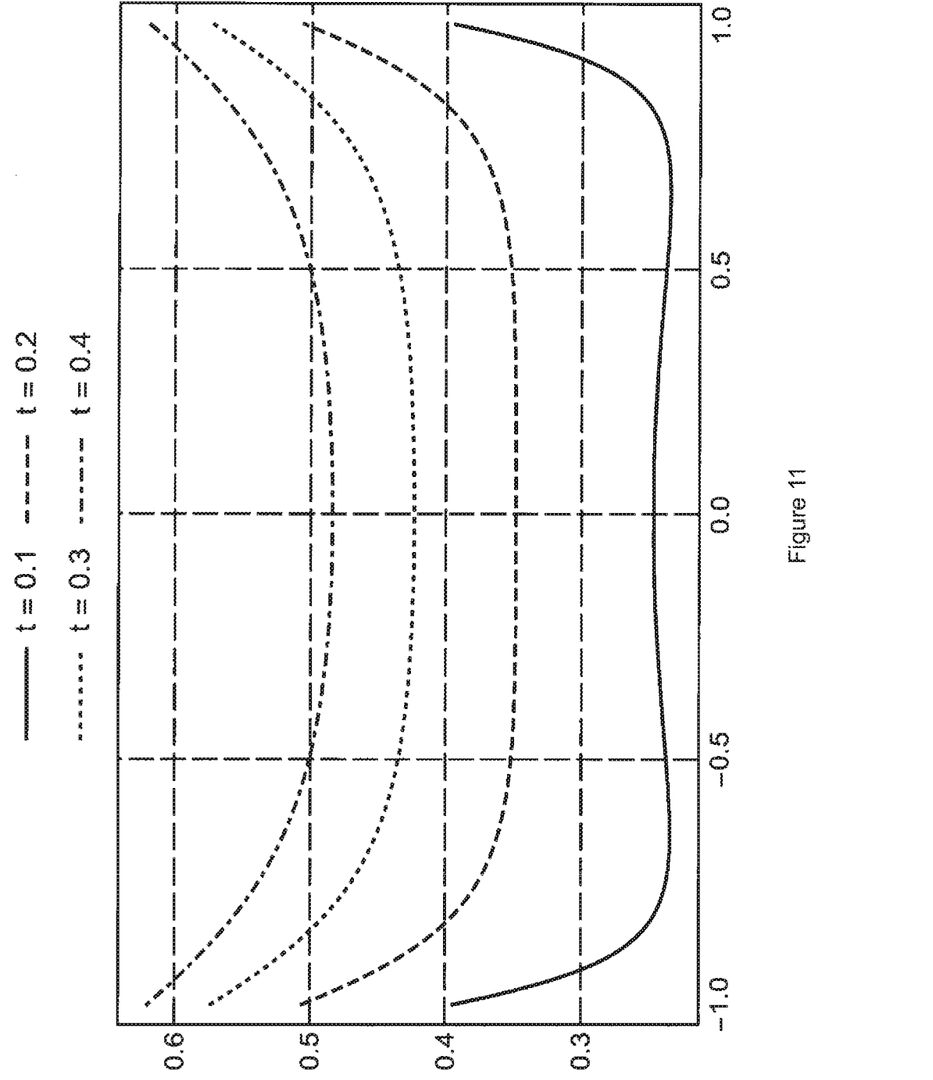
FIG. 11 shows a standard deviation, which is determined, according to an embodiment of the invention, from the normalized $1^{st}$ and the linearly-transformed, approximated $2^{nd}$ moments with the aid of formula 7.

Since a signal which is very similar to the moment of the $2^{nd}$ order results with the multiplication, the standard deviation of the light distribution can be calculated with this obtained approximated $2^{nd}$ order moment. For this purpose, before using formula 7, a general linear transformation of the approximated $2^{nd}$ moment must be performed: by way of example, the equation of formula 10 can be used for this purpose, $$\mu_2'=\alpha(\beta+\mu_2) \qquad \text{(Formula 10)},$$

where $\mu_2$ is the moment that is approximated using the product and subsequently normalized. The constants $\alpha$ and $\beta$ are to be determined with the aid of a calibration measurement. With the aid of $\mu_2'$, the standard deviation can be determined, which, as described above and generally known, is a function of the depth of interaction. This is illustrated by way of example in FIGS. 8 and 11. The functions for calculating the depth of interaction from the standard deviation are to be determined from suitable calibration measurements. The methods are known to the person skilled in the art.

The multiplication can be performed for both embodiments for a direction x or y, or for both directions x and y.

If both directions are used for the estimation of the moment of the $2^{nd}$ order, it can be more accurately approximated.

According to the invention, the DOI problems described above are solved, and information on the depth of the signal along the z-direction of the scintillation monocrystal or of the crystal array with a light distribution of the used sensor chip that depends upon the depth of interaction is obtained. The aims presented are all achieved.

The method can be carried out with all photosensors that include a spatial coding, wherein this is to correspond to a linear coding if possible.

In this case, the output signal of a channel or a combination of channels must change in a manner as linearly increasing as possible with the x- or y- or e-position, while the output signal of another channel or a combination of channels changes in manner as linearly decreasing as possible with the x- or y- or e-position. The direction e is any direction, which can also be composed of x- and y-direction vectors. Direction vectors which result solely from signals of the x-direction or the y-direction are special cases of signals of the e-direction. A linear coding within the meaning of the invention is understood to be any coding which corresponds to formula 11. Q1 is the charge of the output channels increasing via the e-position, and Q2 is the charge of the output channels decreasing via the e-position. The parameter e denotes the coding direction, i.e., x or y or a combination thereof.

$$Q_1(e) = c_1 \cdot e^{c_2} + c_3$$

$$Q_2(e) = c_4 \cdot e^{c_5} + c_6$$

$$c_1 = \text{const.} \in (0, \infty)$$

$$c_4 = \text{const.} \in (-\infty, 0)$$

$$c_3, c_6 = \text{const.} \in (\infty\infty, \infty)$$

$$0.5 < c_2; c_5 < 1.5 \quad \text{(Formula 11)}$$

Formula 11 takes into account that embodiments that do not satisfy the requirements of strict linearity can still be suitable for realizing the teaching according to the invention. Ideally, the linear coding is strictly linear.

In addition, it is possible for a sensor chip to have a linear coding in more than one e-direction—for example, $e_1$, $e_2$, $e_3$, etc. In this case, the moment of $2^{nd}$ order is respectively approximated by multiplying the corresponding increasing and decreasing signal strengths along the coding direction. The more coding directions that are present, the better the $2^{nd}$ order moment can be approximated. A special case is the sensor chips described above, which contain two coding directions, where $e_1$ corresponds to the x- and $e_2$ corresponds to the y-direction. In this case, a linear coding is present in at least one e-direction.

In an advantageous embodiment of the invention, the moment of the $2^{nd}$ order is determined with a resistor network, in addition to the multiplication of the output signals according to the method according to the invention. The depth of interaction can in this case be determined even more accurately.

Current photosensors are SiPM-based sensors, such as LG-SiPM, SeSP and iSiPM, ADP-based sensors, such as position-sensitive APD's, or PMT-based sensors, such as position-sensitive PMT's. The method can also be used in sensors which are developed in the future and have a spatial coding along the x- and y-direction as linear as possible.

FIG. 1 shows in schematic form a photosensor with outputs A, B, C, and D, wherein outputs A and B are on the y-axis, and outputs C and D are on the x-axis. The x-axis and the y-axis are denoted by the arrows.

FIG. 2 shows in schematic form a photosensor having a resistor network or a resistive layer distributing the charges to the corners, wherein the output channels E, F, G, and H for the charge to be read out are positioned in the corners of the photosensor. The arrows denote the x-axis and the y-axis.

FIG. 3 shows a curve in which the multiplication of the photocurrents in $[A^2]$ of two readout channels A and B increasing and decreasing linearly with the x- or y- or e-direction is plotted against the time in [s].

FIG. 4 shows a curve in which the voltage in [V] of the channel J for the embodiment that uses a summing network to determine the moment of the $2^{nd}$ order is plotted against the time in [s].

The comparison of FIGS. 3 and 4 shows that, for the multiplication according to the invention of the signal strength linearly increasing and linearly decreasing for the x-direction, results are obtained that are equivalent to the determination of the moment of the $2^{nd}$ order by means of a summing network.

Figure 5:
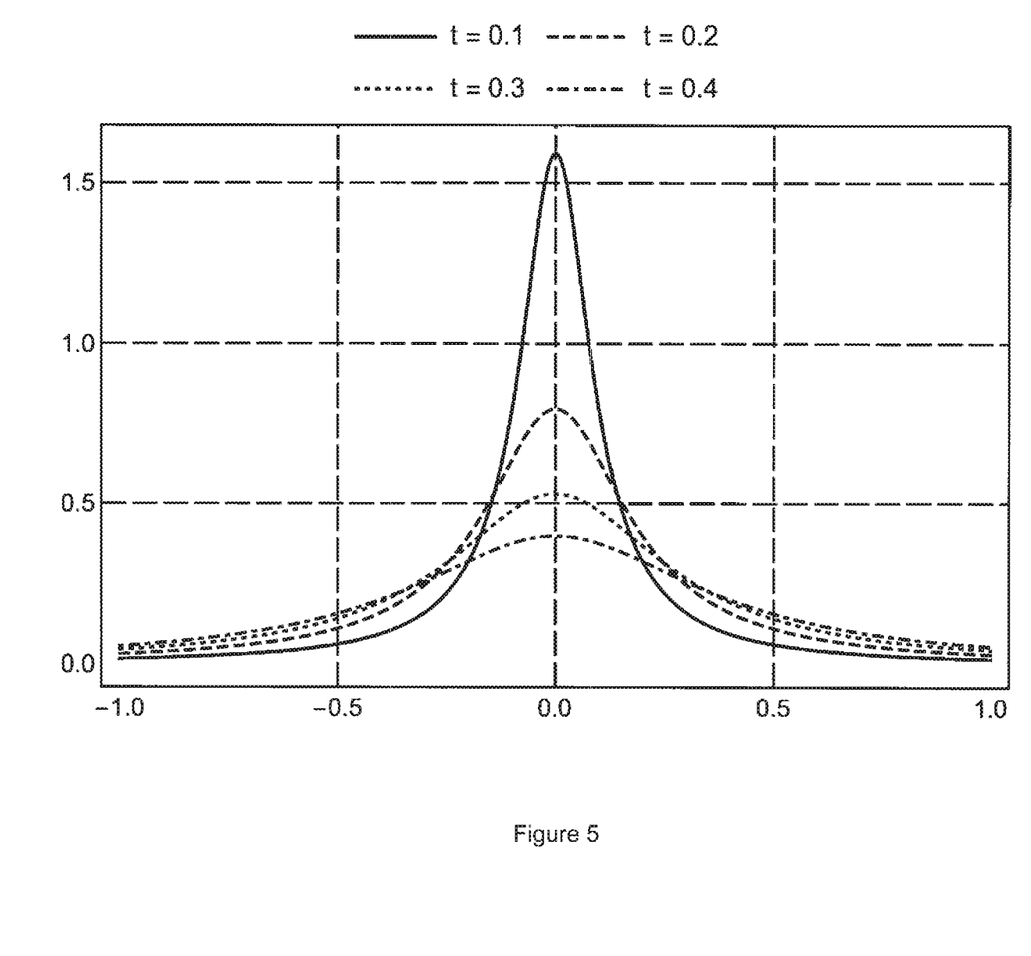
FIG. 5 shows typical light distributions measured when using monolithic scintillator crystals with position-resolving photodetectors.

FIG. 5 shows typical light distributions, measured when using monolithic scintillation crystals with position-resolving photodetectors, when the photoconversion takes place at different depths of interaction t=0.1, t=0.2, t=0.3, and t=0.4 of any units ([a.u.]) in the monolithic scintillation crystal. Axis of abscissas: x-position along the sensor surface [a.u.], axis of ordinates: signal intensity [a.u.].

Figure 6:
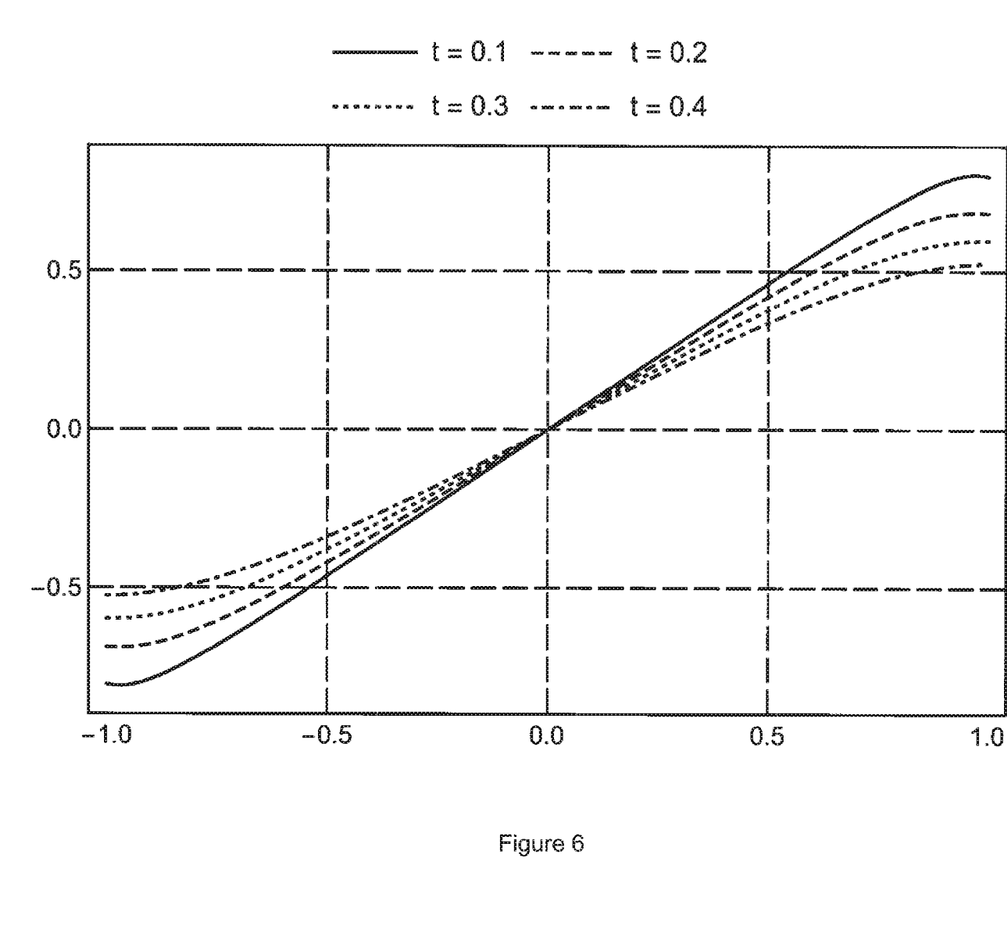
FIG. 6 shows a $1^{st}$ normalized moment, which can be determined with the aid of the position-coded currents according to the prior art.

FIG. 6 shows, for various depths of interaction t=0.1, t=0.2, t=0.3, and t=0.4 [a.u.], the $1^{st}$ normalized moment, which can be determined according to the prior art with the aid of the position-coded currents. Axis of abscissas: actual photoconversion position x along the sensor surface, axis of ordinates: measured photoconversion position (Anger position) [a.u.].

Figure 7:
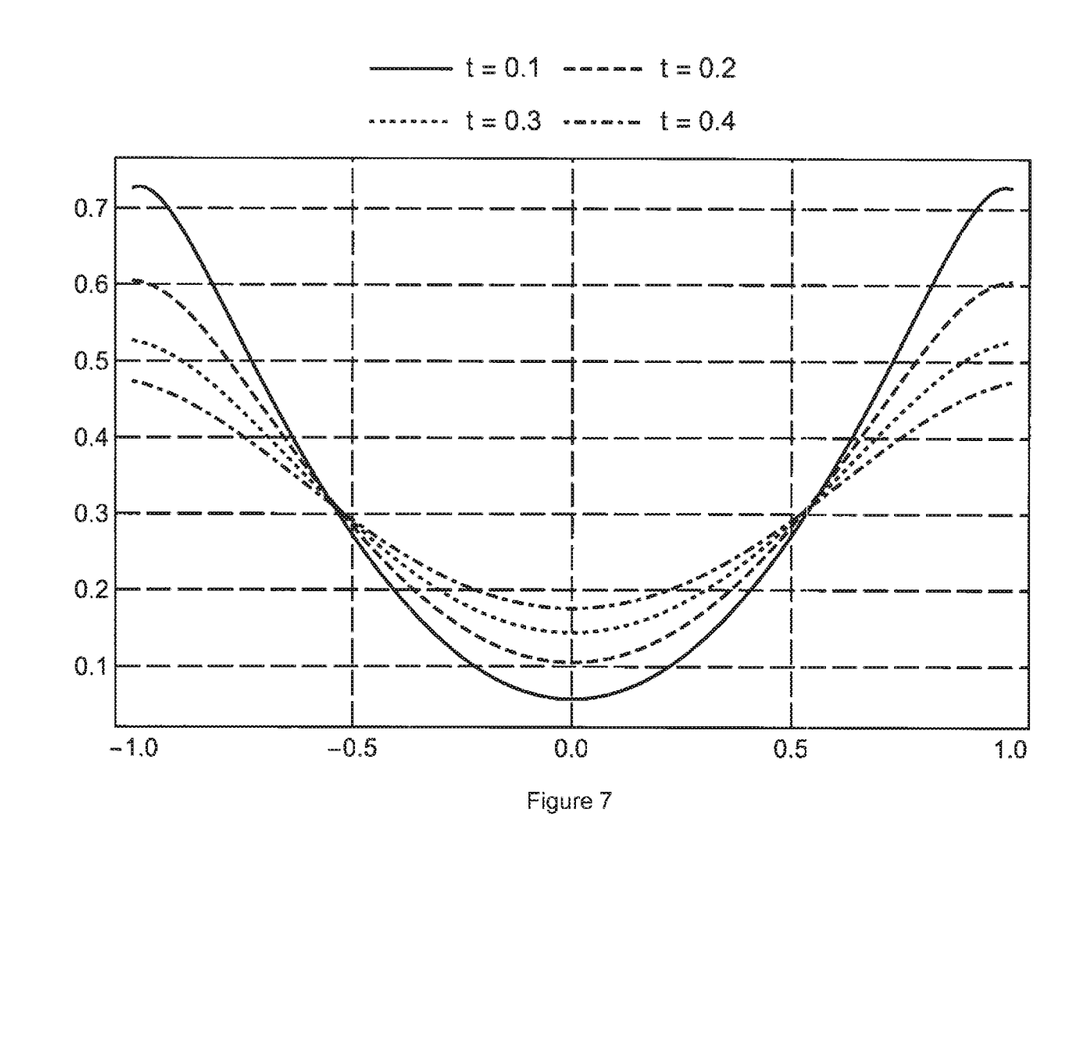
FIG. 7 shows a $2^{nd}$ normalized moment, which can be determined with the aid of position-coded currents according to the prior art, using a summing circuit.

FIG. 7 shows, for various depths of interaction t=0.1, t=0.2, t=0.3, and t=0.4 [a.u.], the $2^{nd}$ normalized moment, which can be determined according to the prior art with the aid of the position-coded currents using a summing circuit. Axis of abscissas: actual photoconversion position x along the sensor surface, axis of ordinates: measured $2^{nd}$ moment [a.u.].

FIG. 8 shows, for various depths of interaction t=0.1, t=0.2, t=0.3, and t=0.4 [a.u.], the standard deviation, which can be determined according to the prior art from the normalized $1^{st}$ and $2^{nd}$ moments with the aid of formula 7. Axis of abscissas: actual photoconversion position x along the sensor surface, axis of ordinates: measured standard deviation [a.u.].

Figure 9:
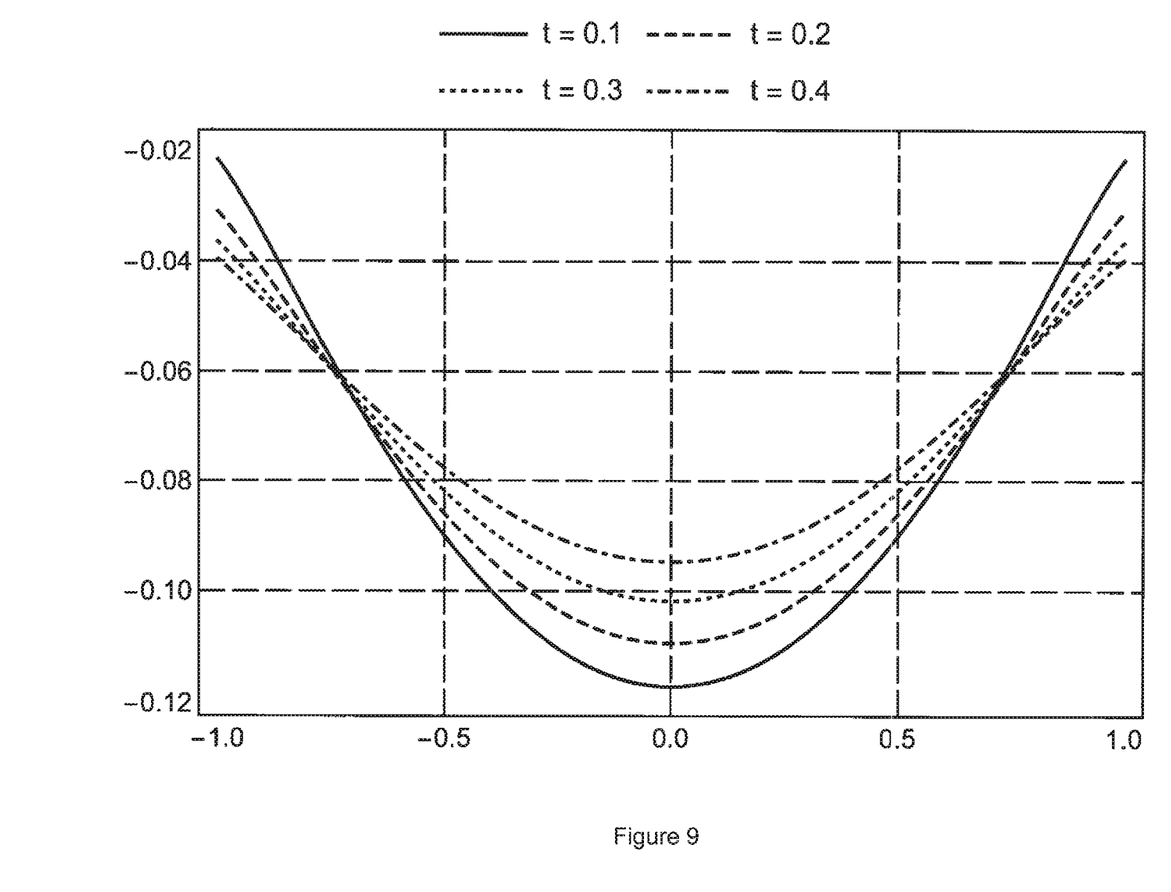
FIG. 9 shows an approximated $2^{nd}$ normalized moment, which can be calculated according to an embodiment of the invention from the product of the position-coded currents.

FIG. 9 shows, for various depths of interaction t=0.1, t=0.2, t=0.3, and t=0.4 [a.u.], the approximated $2^{nd}$ normalized moment, which can be calculated according to the invention from the product of the position-coded currents. Axis of abscissas: actual photoconversion position x along the sensor surface, axis of ordinates: approximated $2^{nd}$ normalized moment (normalized product of the two signals) [a.u.].

Figure 10:
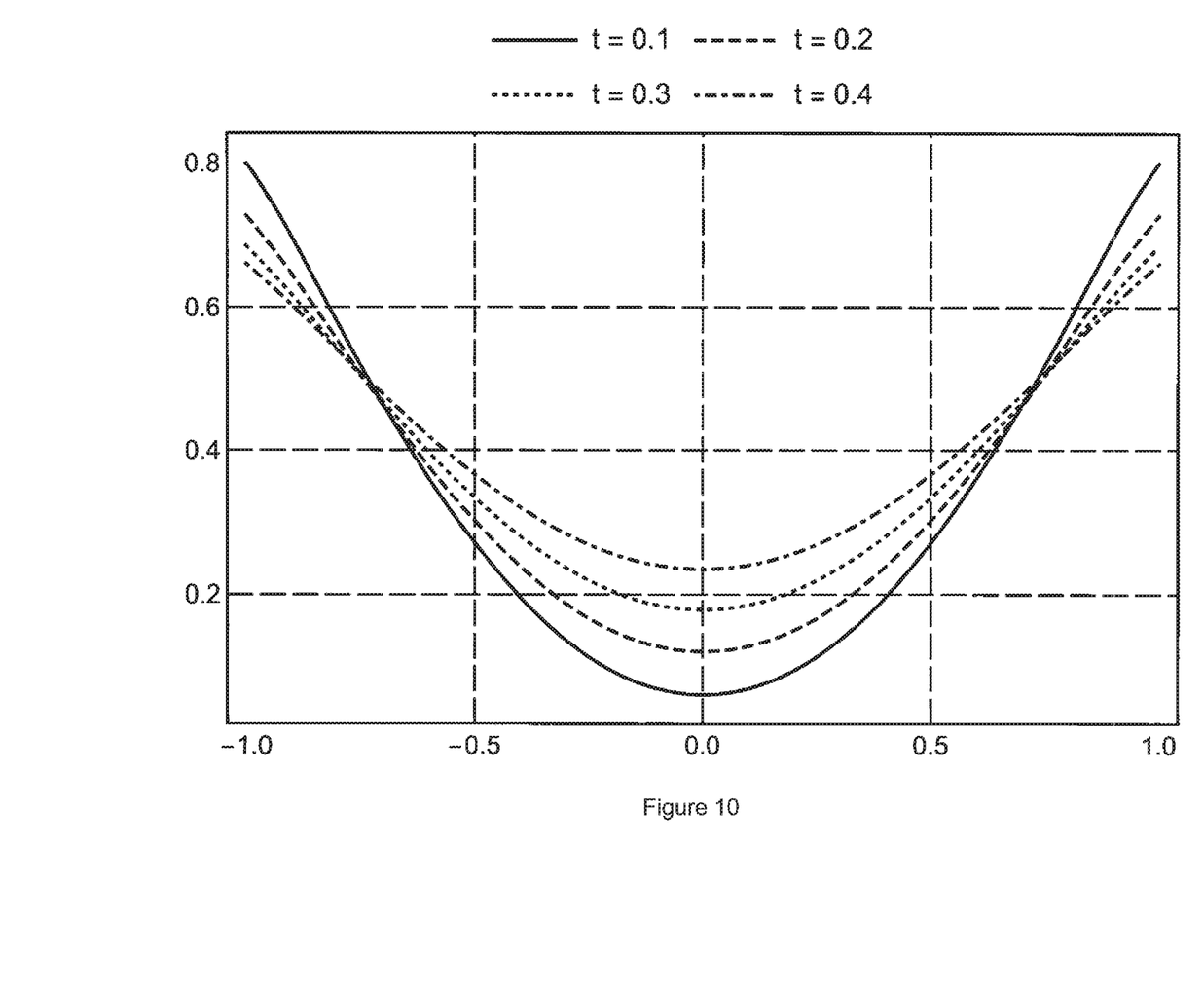
FIG. 10 shows a linearly-transformed, approximated $2^{nd}$ moment according to formula 8.

FIG. 10 shows, for various depths of interaction t=0.1, t=0.2, t=0.3, and t=0.4 [a.u.], the linearly-transformed, approximated $2^{nd}$ normalized moment according to formula 8. Axis of abscissas: actual photoconversion position x along the sensor surface, axis of ordinates: linearly-transformed, approximated $2^{nd}$ normalized moment (scaled, measured, normalized product of the two signals) [a.u.].

FIG. 11 shows, for various depths of interaction t=0.1, t=0.2, t=0.3, and t=0.4 [a.u.], the standard deviation, which can be determined according to the invention from the normalized $1^{st}$ and the linearly-transformed, approximated $2^{nd}$ moment with the aid of formula 7. Axis of abscissas: actual photoconversion position x along the sensor surface, axis of ordinates: measured, approximated standard deviation [a.u.].

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1]: Gola, A., et al., "A Novel Approach to Position-Sensitive Silicon Photomultipliers: First Results."

[2]: Schulz, V., et al., "Sensitivity encoded silicon photomultiplier—a new sensor for high-resolution PET-MRI." Physics in medicine and biology 58.14 (2013): 4733.

[3]: Fischer, P., Piemonte, C., "Interpolating silicon photomultipliers," NIMPRA, November 2012.

[4]: Berneking, A., "Characterization of Sensitivity encoded Silicon Photomultiplier for high resolution simultaneous PET/MR Imaging," diploma thesis, RWTH Aachen University, Dec. 3, 2012.

[5]: Grazioso, R., et al., "APD performance in light sharing PET applications." Nuclear Science Symposium Conference Record, 2003 IEEE (Volume: 3)

[6]: Watanabe, M., et. al., "A HIGH RESOLUTION ANIMAL PET SCANNER USING COMPACT PS-PMT DETECTORS," Nuclear Science Symposium, 1996. Conference Record., 1996 IEEE (Volume: 2)

[7]: Espana, S., et al., "DigiPET: sub-millimeter spatial resolution small-animal PET imaging using thin monolithic scintillators."

[8]: Lerche, Ch. W., et al., "Depth of interaction detection for y-ray imaging."

[9]: U.S. Pat. No. 7,476,864 (B2).

[10]: Ito, M., et al., "Positron Emission Tomography (PET) Detectors with Depth-of-Interaction (DOI) Capability."

[11]: Judenhofer, M. S., et al., "Simultaneous PET-MRI: a new approach for functional and morphological imaging."

[12]: Ziegler, S. I., et al., "A prototype high-resolution animal positron tomograph with avalanche photodiode arrays and LSO crystals."

[13]: Balcerzyk, M., et al., "Preliminary performance evaluation of a high resolution small animal PET scanner with monolithic crystals and depth-of-interaction encoding."

[14]: Balcerzyk, M., et al., "Initial performance evaluation of a high resolution Albira small animal positron emission tomography scanner with monolithic crystals and depth-of-interaction encoding from a user's perspective."

[15]: McElroy, D. P., et al., "First Results From MADPET-II: A Novel Detector and Readout System for High Resolution Small Animal PET."

[16]: Gonzalez Martinez, A. J., et al., "Innovative PET detector concept based upon SiPM's and continuous crystals."

[17]: Siegel, S., et al., "Simple Charge Division Readouts for Imaging Scintillator Arrays using a Multi-Channel PMT."

[18]: Niknejad, T., et al., "Development of high-resolution detector module with depth of interaction identification for positron emission tomography."

[19]: Tsuda, T., et al., "Performance Evaluation of a Subset of a Four-Layer LSO Detector for a Small Animal DOI PET Scanner: jPET-RD."

[20]: Gonzalez, A. J., et al., "The MINDView brain PET detector, feasibility study based on SiPM arrays."

The invention claimed is:

1. A method for photosensor signal processing, the method comprising:
   carrying out, by measuring a combination of readout channels of a direction e with linearly increasing and linearly decreasing signal strength, a linear coding in at least one e-direction,
   wherein the linearly increasing and linearly decreasing signal strengths of readout channels of the direction e, which are respectively used for the linear coding, are multiplied by each other,
   wherein the linear coding satisfies the edge condition:

$$Q_1(e) = c_1 \cdot e^{c_2} + c_3$$

$$Q_2(e) = c_4 \cdot e^{c_5} + c_6$$

$$c_1 = \text{const.} \in (0, \infty)$$

$$c_4 = \text{const.} \in (-\infty, 0)$$

$$c_3, c_6 = \text{const.} \in (-\infty, \infty)$$

$$0.5 < c_2; c_5 < 1.5,$$

wherein $Q_1$ denotes the charge of the output channel signal strengths increasing via the e-position and $Q_2$ denotes the charge of the output channel signal strengths decreasing via the e-position and the coding direction, and
   wherein the depth of interaction is approximated using:

$$\sigma_{light}^2 = \frac{\mu_2}{\mu_0} - \frac{\mu_1^2}{\mu_0^2}$$

and associated calibration measurements from a first moment of the e-direction and a linear transformation of a second moment of the e-direction.

2. The method according to claim 1, wherein a linear coding in an x-direction is carried out via signals of output channels A and B according to:

$$x = \frac{Q_A - Q_B}{Q_A + Q_B}, \text{ and}$$

wherein signals of output channels A and B are multiplied by each other and/or in which a linear coding in the y-direction is carried out via signals of output channels C and D according to:

$$y = \frac{Q_C - Q_D}{Q_C + Q_D}, \text{ and}$$

wherein the signals of output channels C and D are multiplied by each other.

3. The method according to claim 1, wherein four readout channels with outputs E, F, G, and H are used for the linear coding, each of the four readout channels contributing to the linear coding in an x-direction and a y-direction, wherein a linear coding for the x-direction is carried out via signals according to: $x=((Q_F+Q_H)-(Q_E+Q_G))/(Q_E+Q_F+Q_G+Q_H)$, and/or wherein a linear coding in the y-direction is carried out via signals according to: $y=((Q_E+Q_F)-(Q_G+Q_H))/(Q_E+Q_F+Q_G+Q_H)$, and wherein signals for the coding of the x-direction according to: $(Q_F+Q_H)*(Q_E+Q_G)$ for the x-direction and signals for the coding of the y-direction $(Q_E+Q_F)*(Q_G+Q_H)$ for the y-direction are multiplied.

4. The method according to claim 1, wherein the moment of the 2nd order is additionally determined by a summing network.

5. The method according to claim 1, wherein a strict linear coding is carried out.

* * * * *